Nov. 20, 1928.
C. M. OSTERHELD
ELECTRIC BURNER
Filed Nov. 22, 1924    2 Sheets-Sheet 1
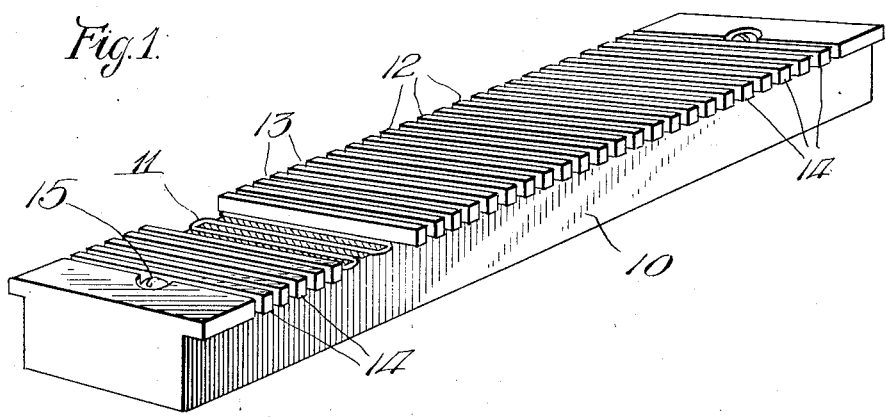
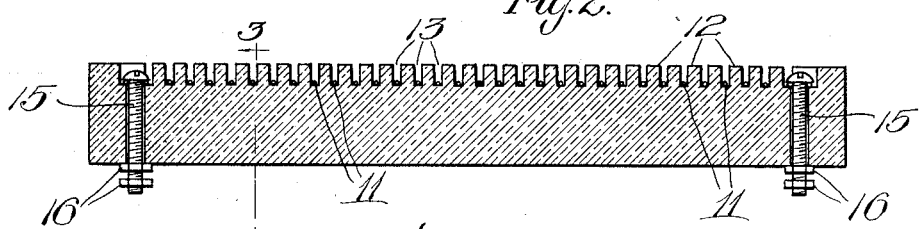
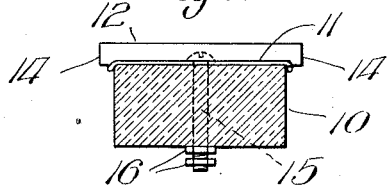
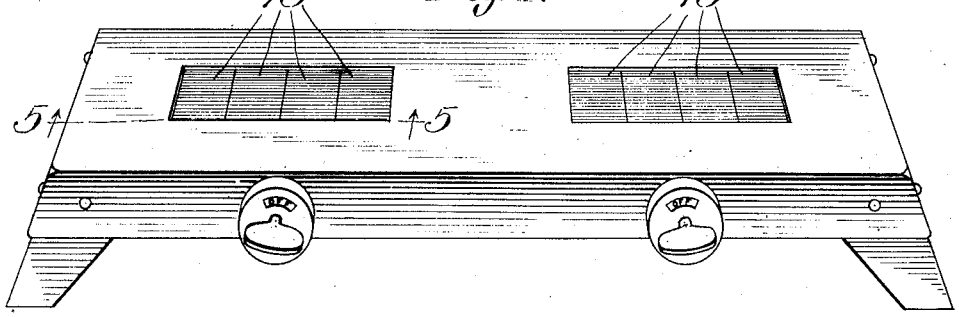
Inventor:
Clark M. Osterheld.

Nov. 20, 1928.
C. M. OSTERHELD
1,692,221
ELECTRIC BURNER
Filed Nov. 22, 1924  2 Sheets-Sheet 2
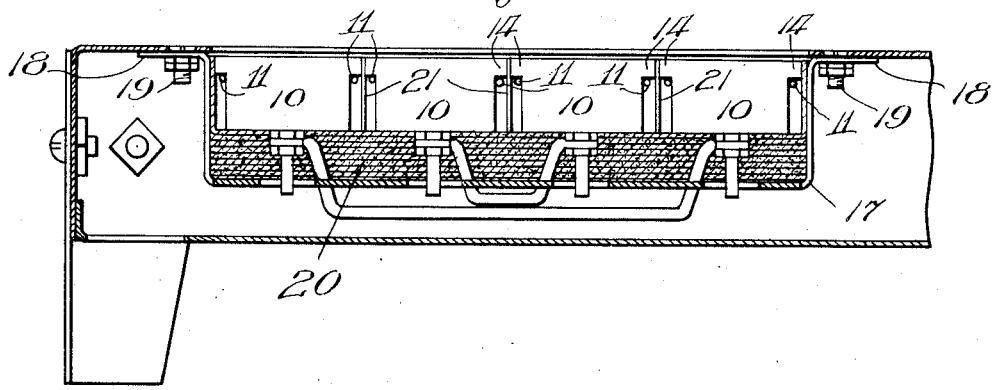
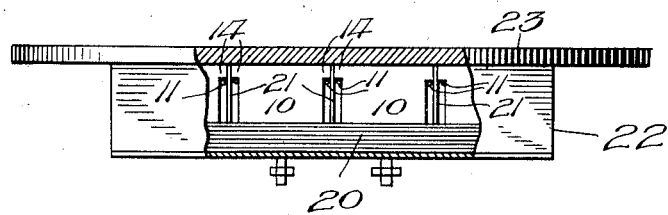
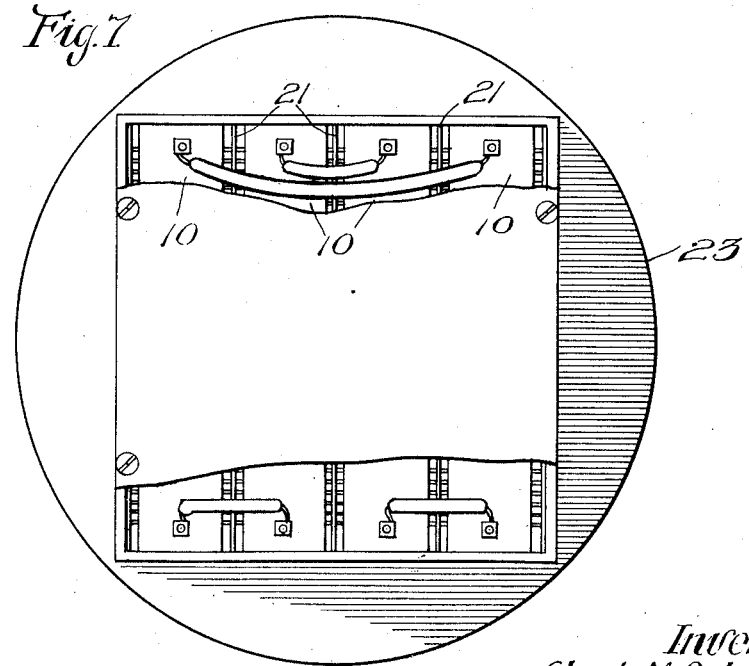
Inventor:
Clark M. Osterheld.

Patented Nov. 20, 1928.

1,692,221

UNITED STATES PATENT OFFICE.

CLARK M. OSTERHELD, OF STOUGHTON, WISCONSIN, ASSIGNOR TO McGRAW ELECTRIC COMPANY, OF OMAHA, NEBRASKA, A CORPORATION OF DELAWARE.

ELECTRIC BURNER.

Application filed November 22, 1924. Serial No. 751,466.

This invention relates to electric burners and aims primarily to provide an exceptionally durable burner of the exposed resistance wire type.

The invention may be understood by reference to one illustrative embodiment shown in the accompanying drawings, in which:

Fig. 1 is a perspective view of a single burner element or unit;

Fig. 2 is a longitudinal vertical section of the same;

Fig. 3 is a vertical transverse section on line 3—3 of Fig. 2;

Fig. 4 is a perspective view of one type of electric stove employing several of the burner units of Figs. 1, 2 and 3;

Fig. 5 is an enlarged vertical section on line 5—5 of Fig. 4;

Fig. 6 is a sectional elevation of an electric griddle employing several of the burner units; and Fig. 7 is a bottom plan view of the same, with parts broken away to show the interior construction.

The ideal arrangement for cooking electrically would probably be to employ a flat ribbon of some efficient resistance material which is heated to redness and to place a cooking vessel formed of some electrical insulator, which conducts heat well, directly upon the flat ribbon, so as completely to cover the same. Such an arrangement being impracticable, this invention aims to provide a practicable electric burner which in results obtained approximates the ideal arrangement.

According to the invention, a burner element is employed consisting of an electric insulator body upon which is secured a resistance wire in dielectric relation to one face of the body with substantially its entire length at a uniform distance from said face so that heat from the wire is conveyed by radiation, convection and conduction to any object supported on said face. Conveniently, the insulator body has a form facilitating the grouping or assembling of several of the units to form a compact commercial type of burner. The burner units and the burner assembly are so constructed and arranged that even if foodstuffs are spilled upon the burner while in operation, short-circuiting of the wire of a single unit, as well as short-circuiting between adjacent units, are largely or wholly prevented, thus eliminating "pitting" of the resistance wires, which ultimately causes breakage.

It is to be understood that the illustrative form shown in the drawings is simply a preferred embodiment of the invention; and that in the following explanation of that specific form, the described details of structure and organization are merely exemplary.

Referring first to Figs. 1, 2 and 3, the burner unit comprises an insulating body 10 and a resistance wire 11. The body 10 is conveniently rectangular and elongated as shown and has its bottom and two ends substantially plane. Along its upper face, the body 10 has a series of integral spaced fins 12 extending transversely of the block, said fins narrow and of considerably greater width than the spaces between them, so that a multiplicity of narrow parallel slots 13 of equal depth are provided on the upper face of the block.

Within slots 13 the resistance wire 11 is carried, being wound about the ends of the fins 12 which preferably provide projecting shoulders 14 at opposite sides of the insulating body. Thus the wire is mechanically interlocked with the block. The slots 13 are of sufficient width to receive one strand of the wire and permit free thermal expansion thereof. At its ends, the wire is connected to binding posts 15, which pass vertically through holes provided at opposite ends of the block and have nuts 16 at their lower ends, permitting the resistance wire to be connected in series with a conductor.

In the described construction, the courses of the resistance wire are a substantially uniform distance apart and yet are quite close together. The slots between the fins are so narrow that short-circuiting of the courses of the wire by spilling of foodstuffs rarely occurs. The entire length of resistance wire is located above the main body of the insulating body and is completely exposed, with a result that in operation nearly all the heat is radiated or reflected outwardly from the fins, and only a very small fractional part of the heat is lost by conduction through the heavy mass of the insulator. Furthermore, the individual fins themselves conduct considerable heat upwardly to a cooking vessel supported upon the cooking surface provided by the upper surfaces of the fins. Because of the proximity of the entire length of the resistance wire to the cooking vessel, rapid heating may be obtained with the lowest practicable resistance wire temperature. This makes for long life of the burner units.

Referring to Figs. 4 and 5, there is shown a two-burner type of electrical stove, wherein each burner is composed of four of the described burner units, which are placed side by side with their heating surfaces in the same plane to form a substantially square burner. When projecting shoulders are provided by extension of the fins, as in the illustrative construction, such shoulders will space juxtaposed burner units sufficiently far apart to prevent short-circuiting. Obviously the burner units may be otherwise arranged.

The assembly of burner units shown in Fig. 5 is secured upon the stove by means of a removable carrier 17 whose end flanges 18 are secured by screws 19 to the stove top. Between the burner units and the bottom of the carrier a number of sheets of asbestos 20 may be placed, not only to prevent so far as possible loss of heat, but also to provide a cushion for the burner units, so that the latter may individually yield somewhat if pressed or struck.

If four units make up a burner, the inner and outer pairs are usually connected in parallel to the conductor, so that the burner may be used even if one of the units is broken, and so that by control through the proper kind of switch the inner pair of units may be turned on independently of the outer units,—an arrangement which is advantageous in cooking, as will be understood.

When two or more of the units are assembled to form a composite burner, as shown in Figs. 5 and 7, a strip of mica 21 is best interposed between each pair of burner units to stand upright between the rows of projecting insulator shoulders 14, for the purpose of preventing any spilled foodstuff from short-circuiting adjacent units. Such mica strips also aid in heat-insulating the units, which is often advantageous.

Instead of exposing the burners, they may be covered by a metal plate which is held against the heating surfaces of the units. Such a metal plate may be used as a griddle, for example. In Figs. 6 and 7 there is shown an electric griddle heated by a burner similar to the one shown in Fig. 5. The body 22 of the griddle serves as a casing for the composite burner and the asbestos insulation; and the circular plate 23 of the griddle, which is in contact, or substantially in contact, with the heating surfaces of the burner units, is preferably of larger diameter than the width of the body 22, thus providing a cooking surface whose area materially exceeds the total area of the heating surfaces of the units, thereby rapidly conducting away the generated heat and largely increasing the overload capacity of the griddle.

Obviously the present invention is not restricted to the particular embodiment thereof herein shown and described. Moreover, it is not indispensable that all the features of the invention be used conjointly since they may be employed advantageously in various combinations and subcombinations as defined in the claims.

It will also be understood that while I have described and illustrated my burner unit in connection with electric cooking apparatus, such unit is equally useful for any other devices which employ electrical energy as a source of heat, and such use is within the scope of the present invention and the appended claims.

What I claim is:—

1. A burner for electric devices comprising, in combination, two pairs of heating units placed side by side but insulated from each other; said heating units comprising each an insulating body and a resistance wire mounted thereon; the inner pair of units being connected in parallel and the outer pair of units likewise connected in parallel; and a single switch connected, constructed and arranged to control the current through all the units and independently to open and close the circuit including the two outer units.

2. A burner for electric devices comprising, in combination, a plurality of structurally unitary heating units each including an insulating block and a resistance wire wound upon it; means for supporting said units to form a substantially continuous heating surface; means for insulating the units from each other; and conductors electrically connecting certain of the units.

3. In an electric burner for electrically heated devices, in combination, a plurality of heating units placed side by side; each heating unit comprising a block of insulating material and a resistance wire carried by said block; each block having a plurality of spaced fins projecting from one face thereof and extending laterally beyond the side faces of the block to provide a number of projecting shoulders; the wire passing under said shoulders from the space between one pair of fins to the space between the adjacent pair thereof; said shoulders also maintaining the wires of adjacent blocks spaced and therefore air-insulated from each other.

4. An electric burner, comprising, in combination, a metallic supporting frame; a plurality of structurally independent heating units carried side by side in said frame and unattached thereto; each heating unit comprising a dielectric block and a resistance wire wound thereon to be exposed from the upper side of the burner; electrical connections for the units; and a thermal insulator pad interposed between the units and the supporting frame and permitting each unit to move slightly independently of the others to minimize danger of fracturing the blocks.

5. An electric burner comprising, in combination, a plurality of substantially rectangular heating units arranged with their longer sides substantially in contact; each unit provided with a resistance wire spaced a uniform distance from one face thereof; and means separating the resistance wire on one unit from the resistance wire on an adjacent unit.

6. An electric burner comprising, in combination, a plurality of substantially rectangular heating units arranged with their upper flat faces forming substantially one plane and their longer sides substantially in contact; and a thin strip of mica interposed between adjacent units.

7. An electric cooking burner comprising, in combination, a plurality of heating units arranged side by side; each unit consisting of a dielectric block and a resistance wire lying in slots provided transversely of the block; the portions of the block between said slots forming upstanding fins; and mica strips interposed between adjacent units so as to form a barrier to the flow of foodstuffs from one unit to another; said fins forming barriers to a like flow longitudinally of the units.

8. An electric cooking burner comprising, in combination, a series of heating units arranged side by side, each unit consisting of a dielectric block and a resistance wire mounted thereon to lie substantially in one plane spaced slightly from the heating surface of the block, so that objects resting against said heating surface are in dielectric relation to the resistance wire, and a metal plate having one face thereof substantially in contact with the described heating surfaces of each heating unit.

9. An electrically heated device comprising, in combination, a heat-conducting element; a plurality of heating units having heating surfaces complimentary to the surface of said element and arranged side by side with said surfaces substantially in contact with the surface of said element; the heating units each comprising an insulating block and a resistance wire so constructed and arranged that the block electrically insulates the wire from the surface of the element without thermally insulating it.

10. An electric griddle comprising, in combination, a metal plate; a plurality of heating units, each comprising a resistance wire carried upon an insulating block providing a substantially flat heating surface; and means holding said units assembled with the whole of their heating surfaces substantially in contact with the underside of the plate; the area of the plate materially exceeding the combined area of the heating surfaces of the units, so that the plate rapidly conducts away the heat generated by said units, thus greatly enhancing the overload capacity and life of the griddle.

11. An electrically heated device comprising in combination a metallic surface, a plurality of heating elements each comprising a resistance wire carried upon an insulating block and having a heating surface adapted to engage with said metallic surface, means for holding said units assembled with the heating surfaces thereof in contact with said metallic surface, the area of said metallic surface materially exceeding the combined area of the heating surfaces of the units so that said metallic surface rapidly conducts away the heat generated by said units, thus greatly enhancing the overload capacity and life of the units.

12. As an article of manufacture, a unitary block of insulating material having a substantially rectangular form, said block being provided with a multiplicity of integral fins extending laterally across one face thereof and beyond the side walls of said block and forming a multiplicity of lateral projections, each of said fins being of greater height than width and spaced from adjacent fins by a slot narrower than its width, said slots being adapted to receive a wire therein and said lateral projections serving to protect said wire at the ends of said slots.

13. As an article of manufacture, an electric burner unit comprising a unitary block of insulating material having a substantially rectangular form, said block being provided with a multiplicity of integral fins extending laterally across one face thereof and beyond the side walls of said block and forming a multiplicity of lateral projections along each side of said block, each of said fins being of greater height than width and spaced from adjacent fins by a slot narrower than its width, and a wire positioned in said slots and looped about said lateral projections, said fins and projections serving to protect said wire from contact with adjacent objects.

14. In an electrically heated device, in combination, a plurality of substantially rectangular heating units arranged with their longer sides substantially in contact, and each unit having lateral projections along its longer sides to space the resistance wire carried by each unit from the resistance wire of adjacent units.

15. An electrically heated device comprising a plurality of heating units arranged side by side in relatively close relation to each other, each unit consisting of a dielectric block having a surface in engagement with the object to be heated, and a resistance wire mounted on each block and disposed below the surface in engagement with such object.

In testimony whereof, I have signed my name to this specification.

CLARK M. OSTERHELD.